United States Patent [19]

Tirschler

[11] Patent Number: 5,287,977
[45] Date of Patent: Feb. 22, 1994

[54] ROLLER SYSTEM FOR USE IN A ROLLER SCREEN

[76] Inventor: Ehrenfried A. Tirschler, 10 Northridge, Ile Bizard, Quebec, Canada, H9E 1A9

[21] Appl. No.: 993,302

[22] Filed: Dec. 18, 1992

[51] Int. Cl.⁵ ............................................. B07B 13/05
[52] U.S. Cl. .................................... 209/673; 198/789
[58] Field of Search ......................... 209/673; 198/789

[56] References Cited

U.S. PATENT DOCUMENTS

| 1,651,622 | 12/1927 | Norman . | |
|---|---|---|---|
| 4,128,282 | 12/1978 | Post | 209/673 |
| 4,311,242 | 1/1982 | Hnatko . | |
| 4,316,543 | 2/1982 | Leonhardt . | |
| 4,405,050 | 9/1983 | Fenton, Jr. et al. | 209/673 |
| 4,767,010 | 8/1988 | Post | 209/673 |
| 5,080,219 | 1/1992 | Imai et al. | 198/789 |

FOREIGN PATENT DOCUMENTS 418901 3/1991 European Pat. Off. ............ 209/673

Primary Examiner—Robert P. Olszewski
Assistant Examiner—Steven M. Reiss
Attorney, Agent, or Firm—Chilton, Alix & Van Kirk

[57] ABSTRACT

The roller screen arrangement includes a plurality of roller systems and a motor for driving the rollers of the roller system. Each roller system includes a drive shaft drivable by the motor driver and a roller associated with the drive shaft. One end of the drive shaft is disposed adjacent to one end of the roller and insert means are inserted into a hollow core of the roller at the one end of the roller. A threaded opening extends through the insert means and centrally thereof. A central screw is mounted in the hollow core of the drive shaft such that a threaded portion of the central screw extends outwardly of the drive shaft at the one end of the drive shaft, the threads of the central screw mating with the threads of the threaded opening and the central screw being rotatable relative to the drive shaft when mounted in the hollow core of the drive shaft. To connect the roller to its associated drive shaft for rotation therewith, the central screw of the drive shaft is screwed into the threaded opening of the insert of its associated roller.

13 Claims, 5 Drawing Sheets

ROLLER SYSTEM FOR USE IN A ROLLER SCREEN

BACKGROUND OF INVENTION

1. Field of the Invention

The invention relates to a novel roller system for use in a roller screen arrangement. The invention also relates to a roller for use in the roller system.

2. Description of Prior Art

Roller screen arrangements are known in the art as illustrated in, for example, U.S. Pat. No. 1,651,622, Norman, Dec. 6, 1927, U.S. Pat. No. 4,311,242, Hnatko, Jan. 19, 1982 and U.S. Pat. No. 4,316,543, Leonhardt, Feb. 23, 1982.

The '622 patent relates to a roller screen for sifting coal and coke. In accordance with the '622 patent, wear sleeves 35 (see FIG. 2) are provided for the rollers.

A bearing cartridge, shown in FIG. 5, constitutes the invention of the '242 patent. As seen in FIG. 1, doors 19 are provided to permit access to the bearing cartridges.

The '543 patent relates to a roller conveyor for transporting green pellets. The spacing between rollers of the conveyor is varied to provide sieving clearance spaces 7 between some rollers and cleaning clearance spaces 6 between other rollers as illustrated in FIG. 1.

As also seen in the selected references, as well as in other roller screen arrangements known in the art, the arrangements comprise a plurality of parallel rollers, the spaces between the rollers determining the size of materials which will be sieved by the arrangement. All of the rollers are rotated so that the material is both sieved and conveyed by the roller screen arrangement.

The arrangement typically comprises side members (10 in the '242 patent and 3 in the '543 patent) which also function as drive chain cases. The rollers are connected to drive shafts which extend out of the side members, and the rollers rotate with the drive shafts. The drive shafts in turn are driven by a drive means.

Typically, the rollers are connected to the drive shafts by providing inserts, such as 32 in the '242 patent, at the ends of the rollers. The rollers are connected to the drive shafts by screws around a circumference of the insert.

Thus, in prior art devices, in order to install or remove a roller, it is necessary to access the holding screws by operating between the side members and the ends of the rollers. The first step would be to remove the skirting such as illustrated at 34 in the '242 patent.

This area is typically very dirty and difficult to manipulate in. The area between the insert and its adjacent end of the roller first has to be cleaned of all baked-on contaminants which have found their way in there, and the screws can then be accessed. After the screws are removed, it is still necessary to pry the roller off the shaft, using various hand tools.

SUMMARY OF INVENTION

It is therefore an object of the invention to provide a roller system for use in a roller screen arrangement which overcomes the disadvantages of the prior art.

It is a more specific object of the invention to provide a roller system wherein access for installation or removal of the rollers is more convenient.

In accordance with the broad aspect of the invention, the drive shaft includes a hollow core and a central screw extends out of the end of the drive shaft adjacent to the roller. The insert in the roller includes a central threaded opening for receiving the central screw.

In accordance with a particular embodiment of the invention there is provided a roller system for use in a roller screen arrangement, said arrangement including a plurality of said roller systems and a drive means, each said roller system comprising:

a drive shaft drivable by said drive means;

a roller associated with said drive shaft;

said drive shaft having a first end and a second end and a hollow core;

said roller having a driven end and an idle end and a hollow core;

the first end of said drive shaft being disposed adjacent the driven end of its associated roller;

first insert means inserted into the hollow core of said roller adjacent the driven end of said roller;

first connection receiving means on said first insert means;

first connection means being mounted in the hollow core of said drive shaft such that the first connection means extends outwardly of said drive shaft at said first end of said drive shaft, said first connection means being connectably received by said first connection receiving means, said connection means being rotatable relative to said drive shaft when mounted in said hollow core of said drive shaft;

wherein, to connect the driven end of said roller to its associated drive shaft for rotation therewith, said first connection means of said drive shaft is connectably received by the first connection receiving means of its associated roller.

In accordance with a further particular embodiment of the invention there is provided a roller for use in a roller system, said roller system comprising a drive shaft having a first end and a second end and a hollow core, first connection means mounted in the hollow core of said drive shaft and extending outwardly of said drive shaft at said first end of said drive shaft, said first connection means being rotatable relative to said drive shaft when mounted in said hollow core of said drive shaft;

said roller comprising a driven end and an idle end and a hollow core;

first insert means mounted in the hollow core of said roller adjacent the driven end of said roller;

means on said first insert means for connectably receiving said first connection means;

whereby, to connect the driven end of said roller to its associated drive shaft for rotation therewith, said driven end of said roller is disposed adjacent the first end of said drive shaft and said first connection means of said drive shaft is connectably received by said first means for connectably receiving on said first insert of said roller.

In accordance with a still further particular embodiment of the invention there is provided a roller system for use in a roller screen arrangement, said arrangement including a plurality of said roller systems and a drive means, each said roller system comprising:

a drive shaft drivable by said drive means;

a roller associated with said drive shaft;

said drive shaft having a first end and a second end and a hollow core;

said roller having a first end and a second end and a hollow core;

the first end of said drive shaft being disposed adjacent the first end of its associated roller;

insert means inserted into the hollow core of said roller adjacent the first end of said roller;

a threaded opening extending through said insert means and centrally thereof;

a central screw being mounted in the hollow core of said drive shaft such that a threaded portion of said central screw extends outwardly of said drive shaft at said first end of said drive shaft, the threads of said central screw mating with the threads of said threaded opening, said central screw being rotatable relative to said drive shaft when mounted in said hollow core of said drive shaft;

wherein, to connect said roller to its associated drive shaft for rotation therewith, said central screw of said drive shaft is screwed into said threaded opening of said insert of its associated roller.

In accordance with a still further particular embodiment of the invention there is proved a roller for use in a roller system, said roller system comprising a drive shaft having a first end and a second end and a hollow core, and a central screw mounted in the hollow core of said drive shaft such that the threaded portion of said central screw extends outwardly of said drive shaft at said first end of said drive shaft, said central screw being rotatable relative to said drive shaft when mounted in said hollow core of said drive shaft;

said roller comprising a first end and a second end and a hollow core;

insert means mounted in the hollow core of said roller adjacent the first end of said roller;

a threaded opening extending through said insert means and centrally thereof;

whereby, to connect said roller to its associated drive shaft for rotation therewith, said first end of said roller is disposed adjacent the firs end of said drive shaft and said central screw of said drive shaft is screwed into the threaded opening of the insert of said roller.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
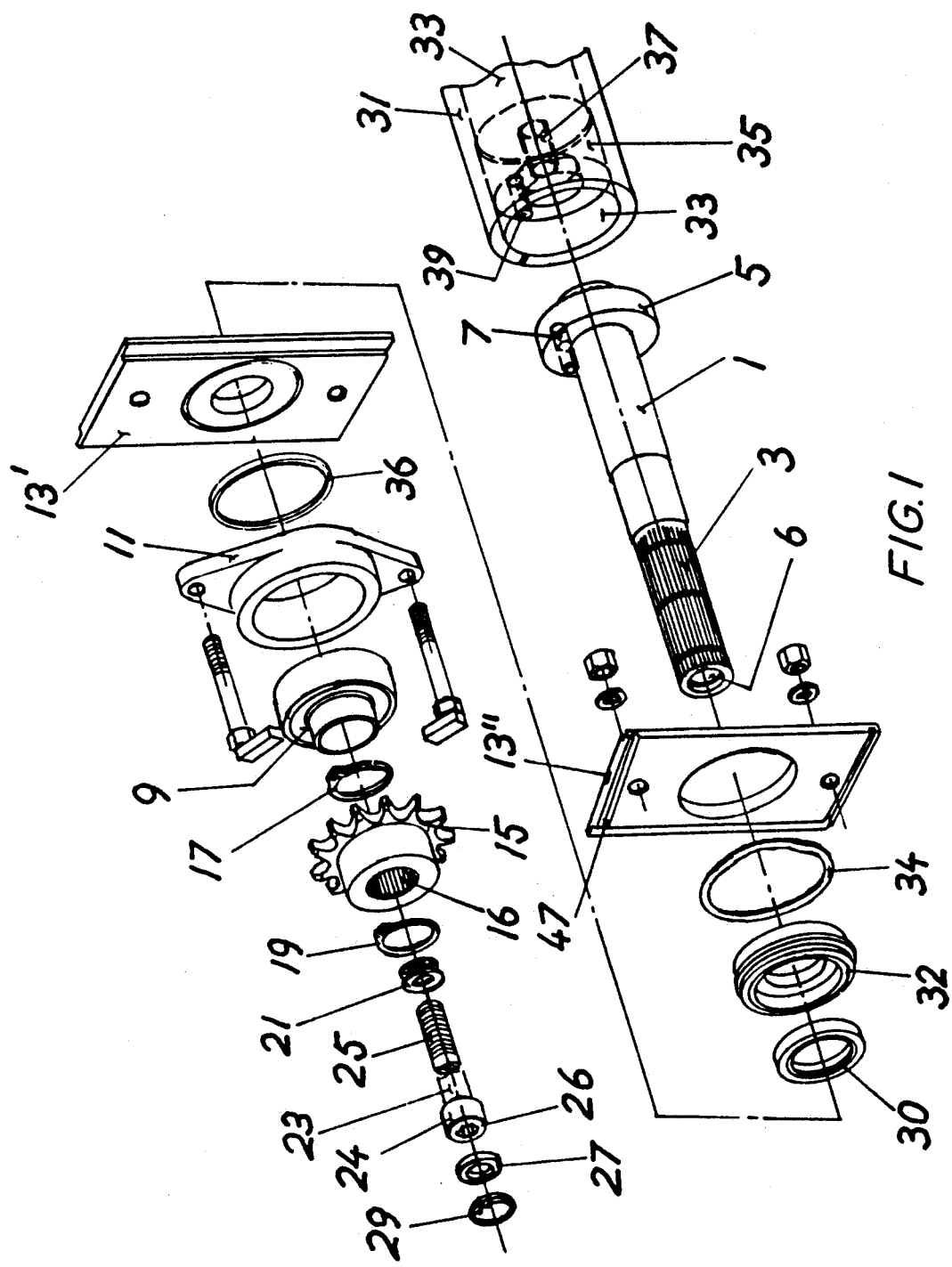
FIG. 1 is an exploded view of a roller system on the driven side in accordance with an embodiment of the invention.
Figure 2:
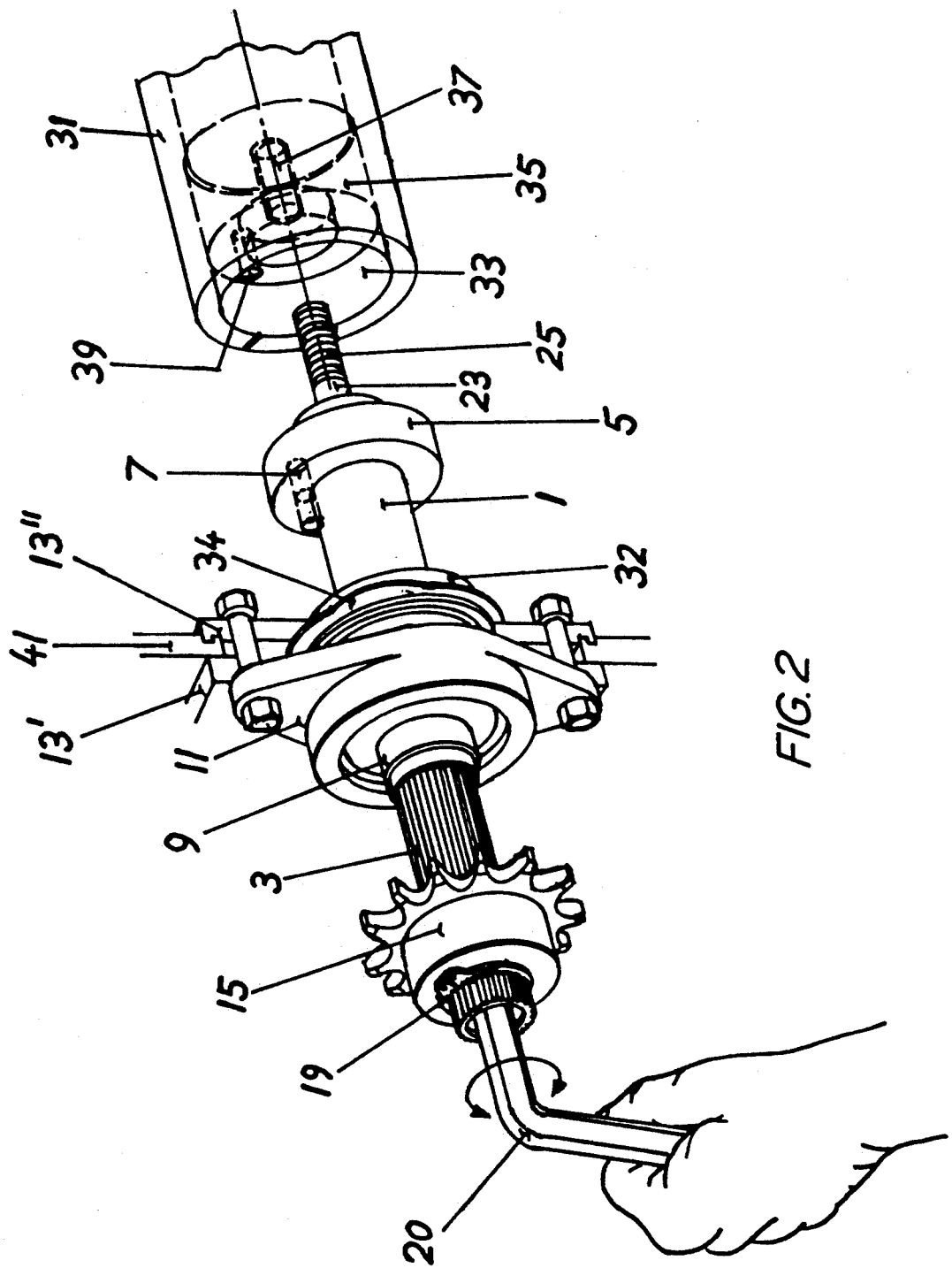
FIG. 2 is an assembled view of the elements illustrated in FIG. 1.

Referring to FIGS. 1 and 2, the system includes a drive shaft 1 having a splined end 3 and a collar 5 at the other end. Extending from the collar 5 is a drive pin 7. The drive shaft has a hollow core 6 which extends the entire length of the drive shaft.

A bearing insert 9, housed in bearing housing 11, is mounted on the drive shaft and connected by screws or the like to sliding adjustment plates 13' and 13" which are more fully described in the discussion of FIG. 3 below. A teethed drive sprocket 15 is also mounted on the drive shaft. As can be seen, the sprocket 15 includes a splined central opening 16. The use of a splined outer surface on the drive shaft for mating with the splined central opening of the sprocket provides a wear free drive connection for the sprockets. In addition, the floating sprockets will assume the position of the chain and side forces and associated wear of the chain is eliminated. This connection is contrasted with prior art connections between the drive shaft and the sprocket which consists of single key ways or square shafts.

The floating distance of the sprocket is limited by external retaining rings 17 and 19 one of which is mounted on the drive shaft at either end of the sprocket.

The system also includes a set of special washers 21, a central screw 23, having a threaded portion 25 and a head 24 having an hexagonal opening 26. A thrust washer 27 follows the central screw and an internal retaining ring 29 is provided at the far end of the drive shaft as best seen in FIG. 3. Also included in the system are a radial lip seal 30, a holder 32 for holding the radial lip seal, and a wave washer 34 for use in conjunction with the seal holder 32. Also, on the other side of plate 13' is a locating ring 36.

To assemble the above-described portion of the system, the drive shaft 1 is extended through the central openings of the plate 13", the wave washer 34, seal holder 32, seal 30, plate 13', ring 36, bearing housing 11 and bearing insert 9 so that the seal 30 and the bearing insert 9 are mounted on the drive shaft 1. The bearing insert is inserted into the housing 11. The seal 30 and its associated parts are then secured to sliding adjustment plates 13' and 13" by screw and bolt arrangements or the like. External retaining ring 17 is then slid over the drive shaft and this is followed by teethed drive sprocket 15 which is in turn followed by external retaining ring 19. The sprocket 15 is then floatingly located at an appropriate place on the drive shaft 1, and the retaining rings 17 and 19 are disposed to limit the floating distance of the sprocket 15 on the drive shaft 1.

The central screw 23 is then inserted into the hollow core 6 of the drive shaft 1 such that the threaded portion 25 of the central screw 23 extends outwardly at the end of the drive shaft containing the collar 5 as shown in FIG. 2. As shown in FIG. 2, in order to rotate the central screw, a tool 20, having an hexagonal cross-section which corresponds to the hexagonal shape of opening 26, is inserted into the hollow core 6 of the drive shaft 1 and into the hexagonal opening 26. By rotating the tool in either a clockwise or counter-clockwise direction, the central screw 23 will be rotated in the same direction. As is apparent from above, the central screw is rotatable relative to the drive shaft 1.

The system also includes a roller 31 having a hollow core 33. An insert 35 is inserted into one end of the hollow core 33 of the roller 31 either by force-fit or by expansion-fit as is well known in the art.

The insert 35 includes a central threaded opening 37 extending the full length of the insert. The threads of the central threaded opening 37 mate with the threads on the threaded portion 25 of the central screw 23.

The insert 35 also includes a drive pin receiving opening 39.

To connect the drive shaft 1 to the roller 31, collar 5 is aligned so that drive pin 7 is in alignment with opening 39 of insert 35. The central screw is disposed in the threaded opening 37, and the tool 20 is inserted into the hollow core 6 of the drive shaft 1 until it engages the hexagonal opening 26. The tool is then rotated in a clockwise direction, so that the threads of the threaded portion 25 engage the threads of the central threaded opening 37, to thereby draw the roller 31 towards the drive shaft 1. This is continued until the outer surface of the insert 35 abuts the facing surface of collar 5 of drive shaft 1.

To remove the roller 31 from the drive shaft 1, the tool 20 is rotated in a counter-clockwise direction. As the central screw 23 disengages from the insert 35, the roller 31 will be pushed away from the drive shaft 1 so that no extraneous force, other than the removal of the screw 23, will be necessary to remove the roller 31 from the drive shaft 1.

Although in the illustrated embodiment, a central screw 23 is used to fix the shaft 1 to the roller 31, other means could be used while still embodying the principles of the present invention.

Figure 3:
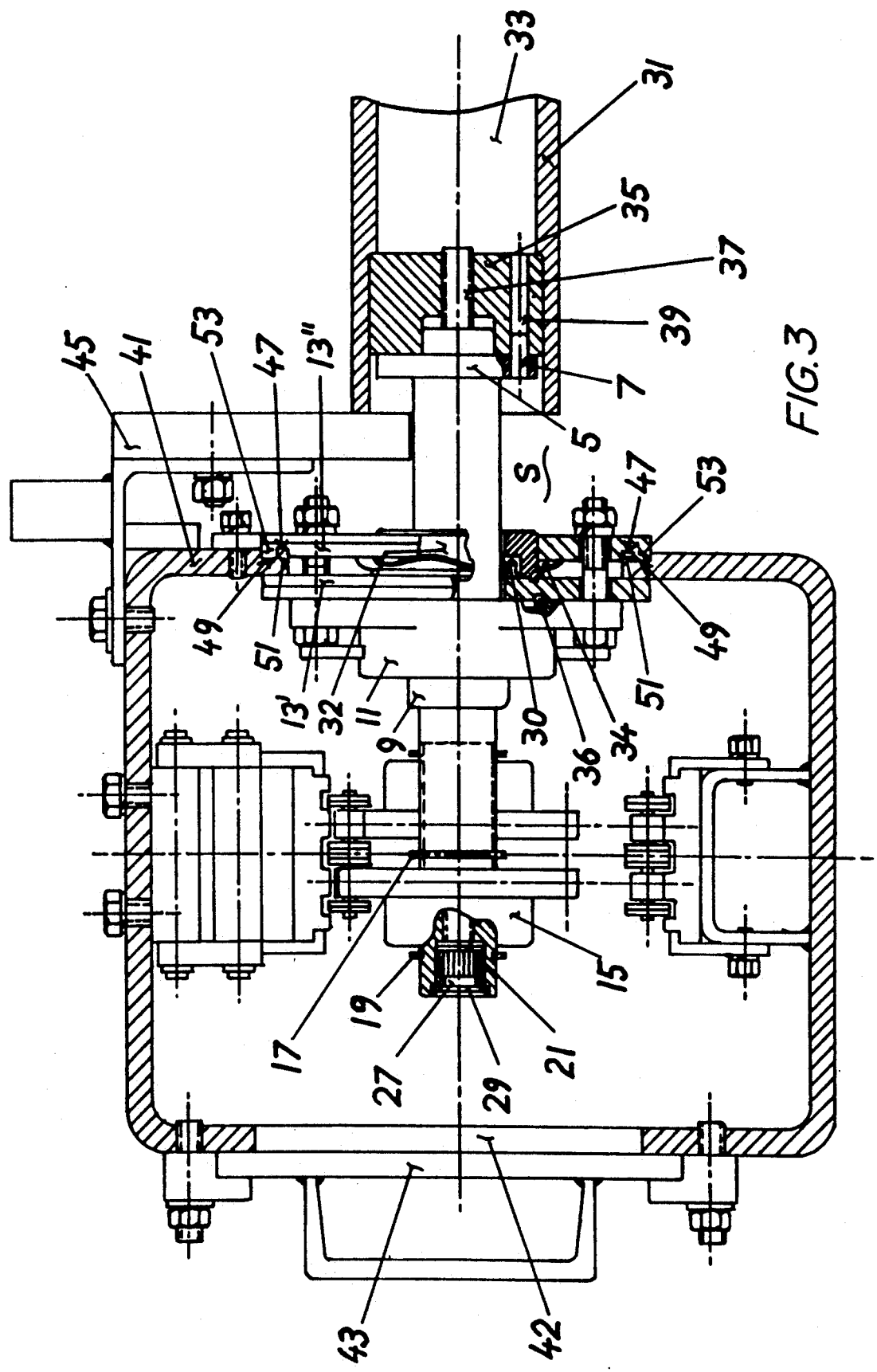
FIG. 3 is a view, partially in section, of the driven side of the system mounted in a side member of a roller screen arrangement.

Referring now to FIG. 3, it will be seen that part of the system is enclosed in a C-section 41 which includes an access opening 42 covered by a removable service door 43. To remove or install a roller, the service door 43 is removed and the tool is inserted into the hollow core 6 of the drive shaft 1 at a clean and uncluttered position. This is in contrast to the prior art arrangements wherein the screws connecting the drive shaft to the roller have to be accessed in the space S. In addition, the presence of the collar 5 prevents baked on iron ore concentrate or other dirt from contaminating the screw as in prior art devices.

As also seen in FIG. 3, outer adjustment plate 13" includes slots 47 while C-section 41 includes slots 49. Protrusions 51 of C-section 41 extend into a respective one of the slots 47, and protrusions 53 of the outer plate 13" extend into slots 49. Thus, the adjustment plates are connected to the C-section in a manner which precludes vertical misalignment and lends additional strength to the C-section 41.

To remove a roller, tool 20 is located in opening 26 of central screw 23 as illustrated in FIG. 2. The tool is then rotated in a counter-clockwise direction. Washer 27 and thrust bearing 29 will prevent the central screw from moving in a leftward direction in FIG. 3. Accordingly, the roller 31 will be moved in a rightward direction.

Figure 3A:
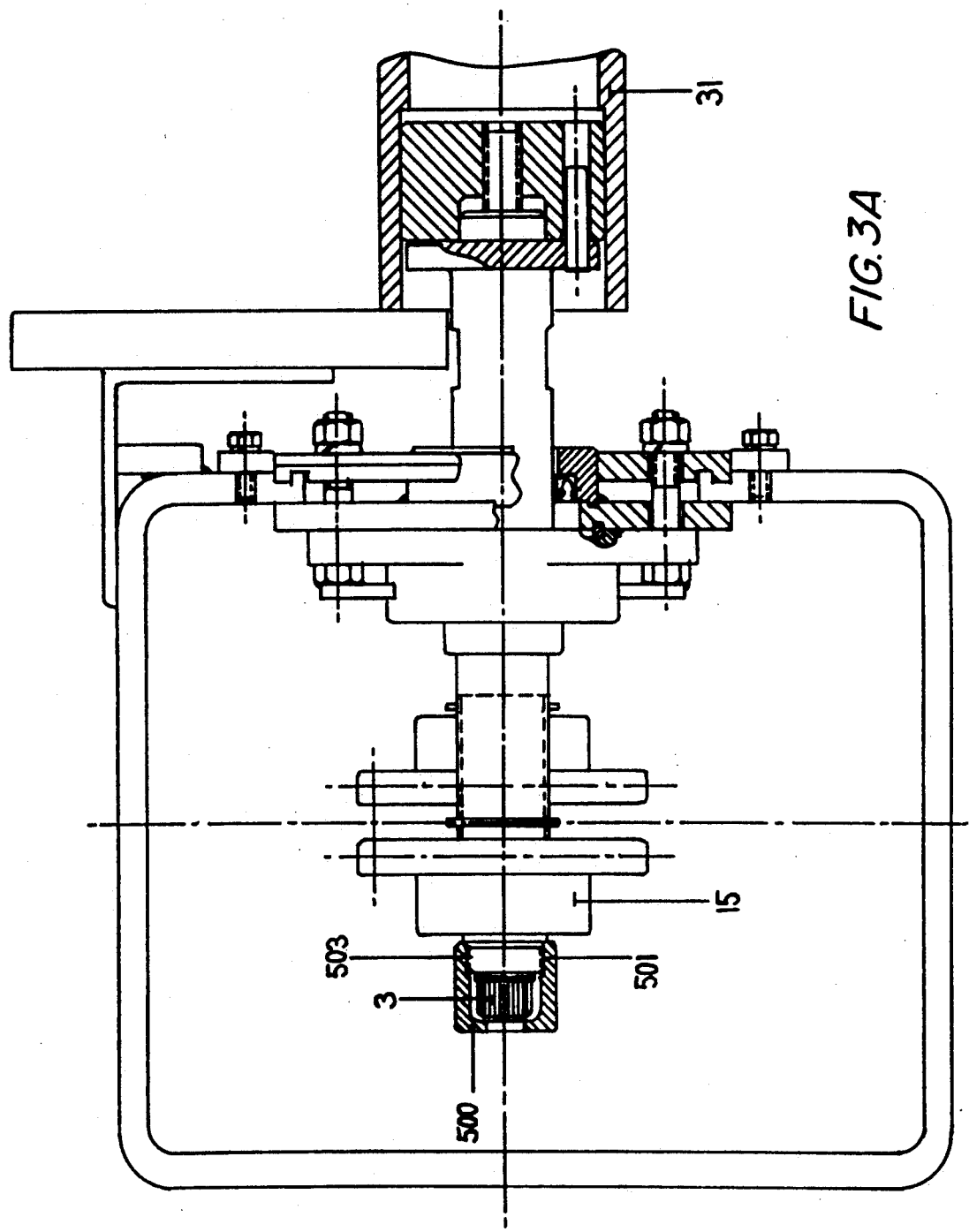
FIG. 3A is a view similar to FIG. 3 but for an alternate embodiment.

In a further embodiment, illustrated in FIG. 3A, the washer 27 and thrust bearing 29 are eliminated and a removable cap 500 is mounted over the splined end 3 of the drive shaft 1. The cap 500 is mounted by the engagement of screw threads 501 on the cap 500 with rotated in a counter-clockwise direction, the cap 500 will prevent the shaft from moving in a leftward direction so that roller 31 will move in a rightward direction.

Figure 4:
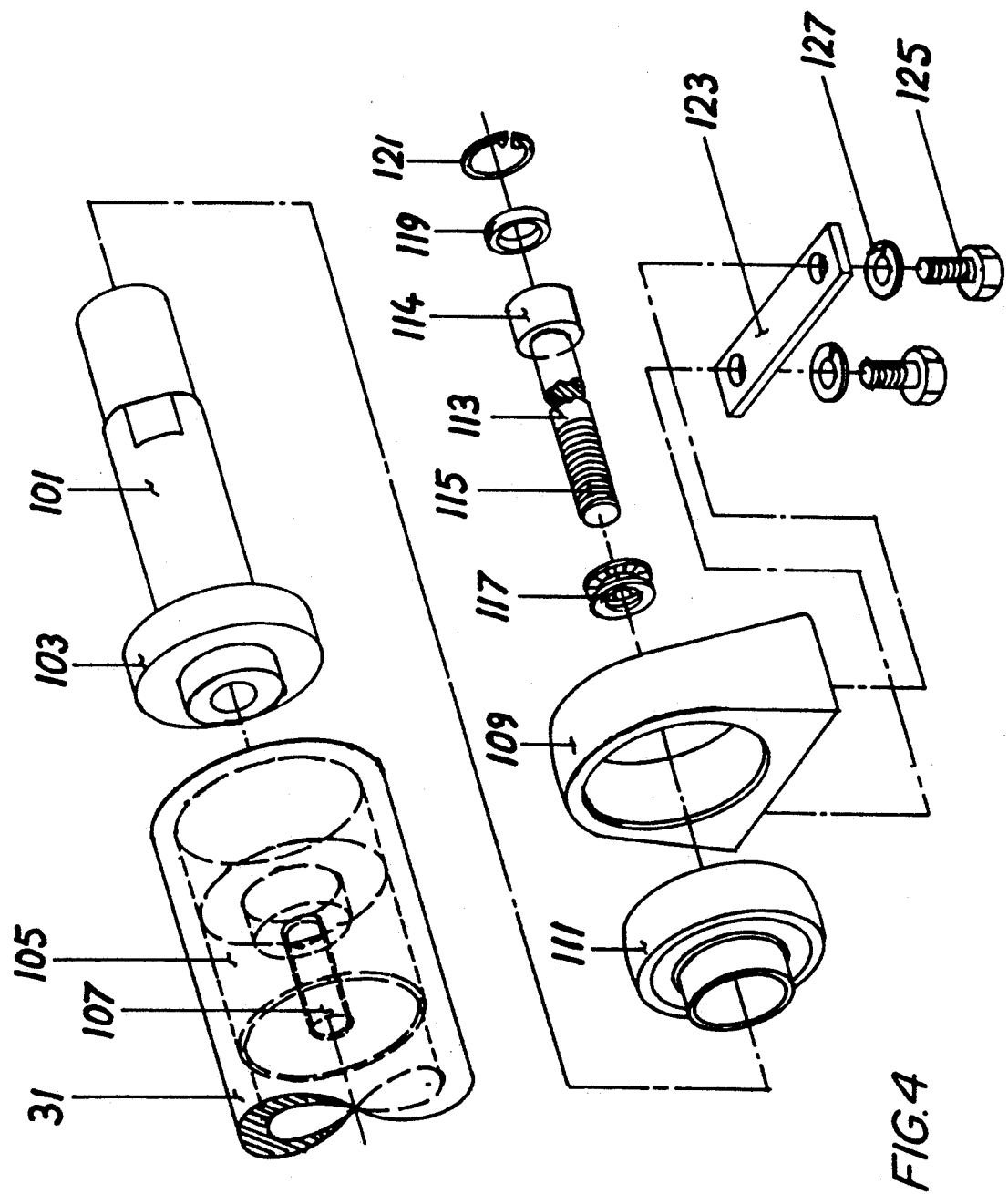
FIG. 4 is an exploded view of a roller system on the idle side thereof in accordance with an embodiment of the invention.

The arrangement at the idler side of the roller 31 is illustrated in FIG. 4. As seen in FIG. 4, the idler side of the arrangement includes an idler shaft 101 having a collar 103 at the end thereof closest to the roller 31. The end of the roller once again includes an insert 105 having a threaded opening 107.

A bearing housing 109 is mounted on the shaft and houses a bearing insert 111. The central screw, 113, includes a screw head 114 and a threaded portion 115. Although not seen in FIG. 4, the screw head will also include a hexagonal opening as the opening 26 illustrated in FIG. 1.

Once again, the front end of the screw extends through special washers 117 and a thrust washer 119 and an internal retaining ring 121 are included at the end of the screw 113 adjacent the head 114 thereof. Plate 123 is used to secure the bearing housing 109 to a horizontal surface by screws 125 and washers 127.

A tool 20, as illustrated in FIG. 2, is used to connect the idler shaft 101 to the roller 31 and to remove the idler shaft 101 from the roller 31 as explained above with respect to the driven side of the roller.

Although a particular embodiment has been described, this was for the purpose of illustrating, but not limiting, the invention. Various modifications, which will come readily to the mind of one skilled in the art, are within the scope of the invention as defined in the appended claims.

I claim:

1. A roller for use in a roller system, said roller system comprising a drive shaft having a first end and a second end and a hollow core, first connection means mounted in the hollow core of said drive shaft and extending outwardly of said drive shaft at said first end of said drive shaft, said first connection means being rotatable relative to said drive shaft when mounted in said hollow core of said drive shaft;
   said roller comprising a driven end and an idle end and a hollow core;
   first insert means mounted in the hollow core of said roller adjacent the driven end of said roller;
   means on said first insert means for connectably receiving said first connection means;
   whereby, to connect the driven end of said roller to its associated drive shaft for rotation therewith, said driven end of said roller is disposed adjacent the first end of said drive shaft and said first connection means of said drive shaft is connectably received by said first means for connectably receiving on said first insert of said roller.

2. A roller as defined in claim 1 and including second insert means mounted in the hollow core of said roller adjacent the idle end of said roller;
   said idle end of said roller being disposed adjacent an idler shaft having a first end and a second end and a hollow core, second connection means mounted in the hollow core of said idler shaft and extending outwardly of said idler shaft at said first end of said idler shaft, said second connection means being rotatable relative to said drive shaft when mounted in said hollow core of said drive shaft;
   means on said second insert means for connectably receiving said second connection means;
   and whereby, to connect said roller at its idle end to its associated idler shaft for rotation therewith, said idle end of said roller is disposed adjacent the first end of said idler shaft and said second connection means of said idler shaft is connectably received by said second means for connectably receiving on said second insert of said roller.

3. A roller as defined in claim 2 wherein said connection means comprises a central screw extending outwardly of said drive shaft at said first end of said drive shaft; and
   wherein said means on said first insert means for connectably receiving said central screw comprises a threaded portion of said first insert means.

4. A roller as defined in claim 3 wherein said second connection means comprises a second central screw and wherein said means on said second insert means for connectably receiving said second central screw comprises a threaded opening in said second insert means.

5. A roller system for use in a roller screen arrangement, said arrangement including a plurality of said roller systems and a drive means, each said roller system comprising:
- a drive shaft drivable by said drive means;
- a roller associated with said drive shaft;
- said drive shaft having a first end and a second end and a hollow core;
- said roller having a driven end and an idle end and a hollow core;
- the first end of said drive shaft being disposed adjacent the driven end of its associated roller;
- first insert means inserted into the hollow core of said roller adjacent the driven end of said roller;
- first connection receiving means on said first insert means;
- first connection means being mounted in the hollow core of said drive shaft such that the first connection means extends outwardly of said drive shaft at said first end of said drive shaft, said first connection means being connectably received by said first connection receiving means, said connection means being rotatable relative to said drive shaft when mounted in said hollow core of said drive shaft;
- wherein, to connect the driven end of said roller to its associated drive shaft for rotation therewith, said first connection means of said drive shaft is connectably received by the first connection receiving means of its associated roller.

6. A roller system as defined in claim 5 and including an idler shaft having a first end and a second end and a hollow core;
- the first end of said idler shaft being disposed adjacent the idle end of its associated roller;
- second insert means inserted into the hollow core of said roller adjacent the idle end thereof;
- second connection receiving means on said second insert means;
- second connection means being mounted in the hollow core of said idler shaft such that the second connection means extends outwardly of said idler shaft at said first end of said idler shaft, said second connection means being connectably received by said second connection receiving means, said second connection means being rotatable relative to said idler shaft when mounted in said hollow core of said idler shaft;
- wherein, to connect said roller at its idle end to its associated idler shaft for rotation therewith, said second connection means of said idler shaft is connectably received by said second connection receiving means of its associated roller.

7. A roller system for use in a roller screen arrangement, said arrangement including a plurality of said roller systems and a drive means, each said roller system comprising:
- a drive shaft drivable by said drive means;
- a roller associated with said drive shaft;
- said drive shaft having a first end and a second end and a hollow core;
- said roller having a driven end and an idle end and a hollow core;
- the first end of said drive shaft being disposed adjacent the driven end of its associated roller;
- first insert means inserted into the hollow core of said roller adjacent the driven end of said roller;
- a first threaded opening extending through said first insert means and centrally thereof;
- a first central screw being mounted in the hollow core of said drive shaft such that a threaded portion of said central screw extends outwardly of said drive shaft at said first end of said drive shaft, the threads of said first central screw mating with the threads of said first threaded opening, said first central screw being rotatable relative to said drive shaft when mounted in said hollow core of said drive shaft;
- wherein, to connect the driven end of said roller to its associated drive shaft for rotation therewith, said first central screw of said drive shaft is screwed into said first threaded opening of said insert of its associated roller.

8. A roller system as defined in claim 7 and including an idler shaft;
- said idler shaft having a first end and a second end and a hollow core;
- the first end of said idler shaft being disposed adjacent the idle end of its associated roller;
- second insert means inserted into the hollow core of said roller arrangement adjacent the idle end of said roller;
- a second threaded opening extending through said second insert means and centrally thereof;
- a second central screw being mounted in the hollow core of said idler shaft such that a threaded portion of said central screw extends outwardly of said idler shaft at said first end of said idler shaft, the threads of said second central screw mating with the threads of said second threaded opening, said second central screw being rotatable relative to said idler shaft when mounted in said hollow core of said idler shaft;
- wherein, to connect the idle end of said roller to its associated idler shaft for rotation therewith, said second central screw of said idler shaft is screwed into said second threaded opening of said second insert of its associated roller.

9. A system as defined in claim 8 and including a first collar adjacent said first end of said drive shaft;
- a drive pin extending from said first collar in a direction away from said first end of said drive shaft;
- a drive pin receiving opening in said first insert for receiving said drive pin.

10. A system as defined in claim 9 and including a flange sprocket mounted on said drive shaft adjacent said second end of said drive shaft;
- said sprocket being connectable to said drive means to drive said drive shaft.

11. A system as defined in claim 10 and including a splined portion at the second end of said drive shaft;
- said flange sprocket having a splined central opening;
- the splines of said drive shaft mating with the splines of said sprocket central opening;
- said sprocket being mounted on the splined portion of said drive shaft.

12. A system as defined in claim 11 wherein said first and second central screws include heads having tool receiving means;
- and further including a tool being receivable by said tool receiving means;
- wherein, said tool is used to rotate said central screw.

13. A system as defined in claim 12 wherein said tool receiving means comprise hexagonal openings in the heads of said first and second screws;
- said tool having a hexagonal cross-section corresponding with the hexagonal openings of said first and second screw heads.

* * * * *